United States Patent
Kwak et al.

(10) Patent No.: US 10,674,748 B2
(45) Date of Patent: Jun. 9, 2020

(54) METHOD FOR PREPARING ORGANIC COATING POROUS GRANULES FOR FISH FEED OR ASSORTED FEED AID USING BLOOD OF LIVESTOCK AND CLAY MINERALS

(71) Applicant: MACSUMSUK GENERAL MEDICAL CO., LTD., Yeongcheon-si, Gyeongsangbuk-do (KR)

(72) Inventors: Sung-Keun Kwak, Yeongcheon-si (KR); Chi-Hun Kwak, Daegu (KR)

(73) Assignee: MACSUMSUK GENERAL MEDICAL CO., LTD. (KR)

( * ) Notice: Subject to any disclaimer, the term of this patent is extended or adjusted under 35 U.S.C. 154(b) by 437 days.

(21) Appl. No.: 15/831,578

(22) Filed: Dec. 5, 2017

(65) Prior Publication Data
US 2018/0092380 A1 Apr. 5, 2018

Related U.S. Application Data

(62) Division of application No. 14/694,012, filed on Apr. 23, 2015, now abandoned.

(30) Foreign Application Priority Data

Oct. 23, 2014 (CN) .......................... 2014 1 0571814

(51) Int. Cl.
 *A23K 50/80* (2016.01)
 *A23K 20/28* (2016.01)
 (Continued)

(52) U.S. Cl.
 CPC .............. *A23K 50/80* (2016.05); *A23K 10/24* (2016.05); *A23K 20/24* (2016.05); *A23K 20/26* (2016.05);
 (Continued)

(58) Field of Classification Search
 CPC ............ A23K 20/28; A23K 50/80; A23J 1/06
 See application file for complete search history.

(56) References Cited

U.S. PATENT DOCUMENTS

| | | | |
|---|---|---|---|
| 5,244,669 A * | 9/1993 | Satoh ...................... | A23K 50/10 424/438 |
| 2002/0119201 A1* | 8/2002 | Simonsen ................ | C12N 9/98 424/490 |

FOREIGN PATENT DOCUMENTS

| KR | 10-0573811 B1 | 4/2006 |
|---|---|---|
| KR | 10-2008-0040296 A | 5/2008 |

(Continued)

OTHER PUBLICATIONS

English language translation of KR 10-0573811, application publication date: Apr. 24, 2006. (Year: 2006).*

*Primary Examiner* — Walter A Moore
(74) *Attorney, Agent, or Firm* — Park & Associates IP Law, P.C.

(57) ABSTRACT

The present invention relates to a method for preparing granules for a fish feed or an assorted feed aid, and more particularly, a method for preparing organic coating porous granules for a fish feed or an assorted feed aid using the blood of livestock and clay minerals. The present invention is to provide granules for a fish feed or an assorted feed aid, wherein the granule contains useful minerals, such as zeolite and bentonite, suitable to be used for a feed, and includes an organic coating layer mainly composed of proteins formed on a surface of the granule by using the blood (let blood) of livestock, so that the time while water infiltrates into pores inside the granule mainly composed of inorganic substances is delayed, thereby obtaining having excellent fluidity.

7 Claims, 7 Drawing Sheets

(51) Int. Cl.
    *A23K 40/30*     (2016.01)
    *A23K 20/24*     (2016.01)
    *A23K 20/26*     (2016.01)
    *A23K 10/24*     (2016.01)

(52) U.S. Cl.
    CPC .............. *A23K 20/28* (2016.05); *A23K 40/30* (2016.05); *Y02A 40/818* (2018.01)

(56) References Cited

FOREIGN PATENT DOCUMENTS

| | | | |
|---|---|---|---|
| KR | 101275250 B1 | * | 6/2013 |
| KR | 10-1462214 B1 | | 11/2014 |

* cited by examiner

Test certificate

| Issue number | 1401198 | Receipt number | 1401198 |
|---|---|---|---|
| Sample name | Shell powder 20% | | |
| Client — Company name | Macsumsuk General Medical Co., Ltd. | | |
| Client — Location | 432, Sari-ri, Daechang-myeon, Yeongcheon-si, Gyeongsangbuk-do | | |
| Date of receipt | 2014. 01. 22 | Test purpose | For reference |

Test items and results

| Test item | Unit | Test item | Note |
|---|---|---|---|
| Moisture | % | 0.99 | |
| Crude ash | % | 97.90 | |
| Silicic acid($SiO_2$) | % | 44.14 | |
| Calcium(Ca) | % | 9.35 | |
| Magnesium(Mg) | % | 0.23 | |

The above disclosure is about test results of samples supplied from the test client, and this test certificate cannot be used for propaganda, litigation, or other legal requirements, other than the purpose.

Analysis certificate

| Client | Corporate name | Macsumsuk General Medical Co., Ltd. |
|---|---|---|
| | Address | 432, Sari-ri, Daechang-myeon, Yeongcheon-si, Gyeongsangbuk-do |
| | Tel. | (054)336-6000 |
| Sample name | | Iron powder, blood powder + macsumsuk (total 2 species) |
| Analysis results | | |

| Analysis items \ Sample name | Iron powder | blood powder + macsumsuk |
|---|---|---|
| Crude protein(%) | 99.06% | 16.60% |
| Crude fat(%) | 0.57% | 0.59% |
| Fe (mg/100g) | 240.14mg/100g | 559.86mg/100g |

The present disclosure is about analysis results of samples supplied as a salt by the test client, and the analysis certificate cannot be used for litigation or other binding materials.

METHOD FOR PREPARING ORGANIC COATING POROUS GRANULES FOR FISH FEED OR ASSORTED FEED AID USING BLOOD OF LIVESTOCK AND CLAY MINERALS

REFERENCE TO RELATED APPLICATIONS

This is divisional of U.S. patent application Ser. No. 14/694,012 filed Apr. 23, 2015, which claims the priority benefit of Chinese Patent Application No. 201410571814.0 filed on Oct. 23, 2014, the entire contents of which are incorporated herein by reference.

FIELD OF THE INVENTION

The present invention relates to a method for preparing granules for a fish feed or an assorted feed aid, and more particularly, to a method for preparing organic coating porous granules for a fish feed or an assorted feed aid using the blood of livestock and clay minerals.

BACKGROUND OF THE INVENTION

Clay minerals are mineral particles having a particle diameter of 0.002 mm or less, and it is known that spreading the surface area of fine particles of 1 g results in an area as wide as a volleyball court.

This is because many pores are formed therein. It has been disclosed a feed manufacturing technology for serving as an adsorption of the microorganism or as a carrier of various functional materials by using these pores.

Parts of the pores existed in the inside of the feeds using common clay minerals are in communication with the outside thereof. Also, other parts of the pores are independently existed therein. Since the amount of the pores independently existed therein is not much in comparison with the total weight of the feed, it is difficult to provide a flowability thereof.

That is, it is difficult to prepare a floating feed for fish through the general feed manufacturing technology using the clay minerals.

Among the feed manufacturing technologies using the clay minerals, a patent application titled "Granule type macsumsuk feed additive and method for preparing the same" (Korean Patent Registration No. 10-0573811, filed Apr. 18, 2006) discloses a technology for preparing the livestock feed using the macsumsuk as the clay minerals.

The above patent discloses that macsumsuk and water are mixed to obtain a slurry, to which calcium carbonate is then mixed, and then the mixture is introduced into a granulator, and the prepared granules are calcined.

However, bubbles inside the granule come out for a short period of time due to high temperature in the procedure of molding and calcining of granules, resulting in a ring-shaped granule having a groove formed in one side thereof as shown in FIG. 1.

When being used as a general livestock feed, the ring-shaped granule having a groove does not cause any problem. Rather, as shown in the above patent, the ring-shaped granule serves as a carrier suitable for microorganism culturing, thereby providing good-quality feed.

However, in the case where this structure is put in water, the groove is filled with water, and thus the granule sinks for a short period of time due to the weight of water.

Thereby, this structure is appropriate as a precipitation feed, but is not an appropriate shape as an extruded feed.

Moreover, the existing inorganic substances using natural minerals for addition of fish feed are mixed with a fish feed after a pulverizing process, and thus, are not uniform in terms of the shape and size of particles, have no floating property of materials and deteriorated fluidity, and precipitate.

For this reason, a feed which is in a floating state for a predetermined time in water while having excellent effects of macsumsuk, and thus is suitable to be used as an extruded feed needs to be developed as shown in the patent document below.

Meanwhile, the "method for developing an agricultural and livestock fertilizer enriched with iron using blood of livestock and an antibiotic-free feed (Korean Patent Publication No. 10-2008-0040296, filed May 8, 2008) discloses a technology in which the blood of livestock is sterilized and processed, and then mixed with organic substances, in organic substances, and microorganism agents, and the mixture is used to prepare a fertilizer or a feed for producing agricultural and marine products.

The above patent discloses that the blood and other additives are mixed and homogenized, and then extruded and molded into pellets.

As such, technologies of reutilizing the blood helpful for growth of livestock as a feed raw material are currently disclosed, but according to the technologies, the organic and inorganic substances are simply mixed, extruded, and molded.

SUMMARY OF THE INVENTION

The present invention has been made in order to solve the above-mentioned problems in the prior art and an aspect of the present invention is to provide granules for a fish feed or an assorted feed aid, wherein the granule contains useful minerals suitable to be used for a feed, and includes an organic coating layer mainly composed of proteins formed on a surface of the granule by using the blood (let blood) of livestock, so that the time while water infiltrates into pores inside the granule mainly composed of inorganic substances is delayed, thereby obtaining having excellent fluidity.

More specifically, an aspect of the present invention is to provide granules for a fish feed or an assorted feed aid, wherein nutrients and minerals necessary for farmed fish are included inside the granule layer; and when a slurry is instantly jetted and dried in a high-temperature granulator, organic substances, such as proteins and fats, which are main components of the blood of livestock mixed with the above ingredients, move to the outside of the granule layer together with moisture and are then dried, to form an organic coating layer wrapping the granule layer, thereby forming multiple pores in the granule layer inside and allowing the organic coating layer outside to prevent the infiltration of moisture into the granule layer by fatty components and the like contained the organic coating layer itself, leading to an improvement in flowability.

At this time, zeolite among the clay minerals contains large quantities of mineral substances, such as minerals, calcium, phosphorus, manganese, zinc, and copper, and thus will be expected to have effects of promoting the growth of farmed fish, improving the flesh, increasing the resistance against diseases, and the like.

Also, it contains minerals necessary for the growth of fish, delays the passage rate of a feed due to expandability thereof to help to improve the digestion and absorption rate, and particularly, the bentonite has excellent cementing property, thereby increasing the hardness of granulated feeds produced.

Moreover, by utilizing the macsumsuk as the additional clay minerals, far-infrared radiation generated from macsumsuk is used to adsorb and remove foreign materials and odor sources, thereby improving the taste of slices of raw farmed fish.

In order to accomplish these objects, there is provided a method for preparing organic coating porous granules for a fish feed or an assorted feed aid using the blood of livestock and clay minerals, the method including: a first mixing step of heating a zeolite ore powder to a temperature of 400-950° C. to prepare 100 parts by weight of the zeolite ore powder, heating a macsumsuk ore powder to a temperature of 800-1,100° C. to prepare 40-60 parts by weight of the zeolite ore powder based on 100 parts by weight of the zeolite, heating a shell powder to 850-950° C. to prepare 0.5-1.1 parts by weight of the shell powder based on 100 parts by weight of zeolite, and preparing 12-60 parts by weight of bentonite based on 100 parts by weight of macsumsuk, followed by mixing, thereby preparing a powder mixture; a second mixing step of preparing the blood of livestock, and then mixing the blood of livestock with the powder mixture at a weight ratio of 1:0.2-2.0, followed by pulverizing, thereby preparing a fluid colloidal slurry; a molding step of jetting the fluid colloidal slurry prepared in the second mixing step through a nozzle at a jet pressure of 7.0 to 13.0 kg/cm$^2$ in a granulator with an inner temperature of 130-400° C., thereby preparing granules having an average diameter of 0.1-3 mm and including a granule layer having a porous structure and an organic coating layer formed outside the granule layer to wrap the granule layer; and cooling the molded granules.

Here, before the molding step, one to three selected from a dispersant, a pH adjuster, and a defoamer may be added.

The fluid colloidal slurry prepared in the second mixing step may have a concentration of 30-50 wt %, a pH value of 7.0-9.5, and a viscosity of 300-1,550 cps.

In accordance with another aspect of the present invention, there is provided a method for preparing organic coating porous granules for a fish feed or an assorted feed aid using the blood of livestock and clay minerals, the method including: a first mixing step of preparing plural clay minerals including a zeolite, a macsumsuk, and a bentonite and then pulverizing, calcining, and mixing them respectively, thereby preparing a powder mixture; a second mixing step of preparing the blood of livestock, and then mixing the blood of livestock with the powder mixture by pulverizing, thereby preparing a fluid colloidal slurry; a molding step of jetting the fluid colloidal slurry prepared in the second mixing step at a high pressure in a granulator with an inner temperature of 130-400° C., thereby preparing granules including a granule layer having a porous structure and an organic coating layer formed outside the granule layer to wrap the granule layer; and cooling the molded granules.

In accordance with further another aspect of the present invention, there is provided an organic coating porous granule for a fish feed or an assorted feed aid using the blood of livestock and clay minerals, wherein the organic coating porous granule is prepared by the method of any one of claims 1 to 4, wherein the organic coating porous granule comprises: a granule layer containing clay minerals, zeolite, macsumsuk, and shells, and having a porous structure; and an organic coating layer wrapping an outside of the granule layer, and containing proteins remaining after the evaporating of moisture in the blood, and wherein the organic coating porous granule has a density of 7.0-1.22 g/cm$^3$, a specific surface area of 25-65 m$^2$/g, and a porosity of 47-62%.

BRIEF DESCRIPTION OF THE DRAWINGS

The above and other objects, features and advantages of the present invention will be more apparent from the following detailed description taken in conjunction with the accompanying drawings, in which:

FIG. 5 is a table showing component analysis of calcined abalone shells as a raw material of the present invention;

FIG. 8 shows an analysis certificate of granules of the present invention.

DETAILED DESCRIPTION OF THE INVENTION

Prior to descriptions of a method for preparing organic coating porous granules for a fish feed or an assorted feed aid using blood of livestock and clay minerals, respective raw materials used for the present invention will be described.

The blood of livestock, which is the raw material of the present invention, will be described.

Materials constituting the blood of livestock are blood cells as non-amorphous components and plasma as an amorphous component. The serum contained in the plasma consists of 90% water, about 9% serum protein, and the balance sugar, fat, and the like.

When the blood of livestock is contacted with an instant high-temperature environment, the moisture vaporizes and the protein becomes the main component.

The application example of the feed technology of the blood of livestock is disclosed in the patent document 2. In the patent document 2, the blood and other additives are mixed and homogenized, and then extruded and molded into pellets, so that the organic substances contained in the blood of livestock are only simply utilized. However, in the present invention, the organic material itself of the blood of livestock is used as nutrients and also, it forms a coating layer wrapping the outside of the granule layer in such a manner that the blood of livestock is jetted into a high-temperature granulator without a separate coating process to form naturally the layer in the course of the evaporation of the moisture, thereby leading to an improvement in flowability.

The clay minerals, which is a component of the present invention forms a part of clay soil and is mainly and secondarily produced. Also, it is a common name of an earthy minerals made of an extremely fine mineral particles and produced from soils or rocks going through weathering or sediments and sedimentary rocks such as volcanic ash etc. in a volcanic development zone.

The main clay minerals may be a kaolin based minerals such as kaolinite, dickite and halloysite; a monmorillonite based minerals such as monmorillonite, bentonite and acid clay; a micas such as illite and glauconite; chlorite; and an allophane etc.

The present invention is characterized in that the various clay minerals includes a zeolite.

Figure 1:
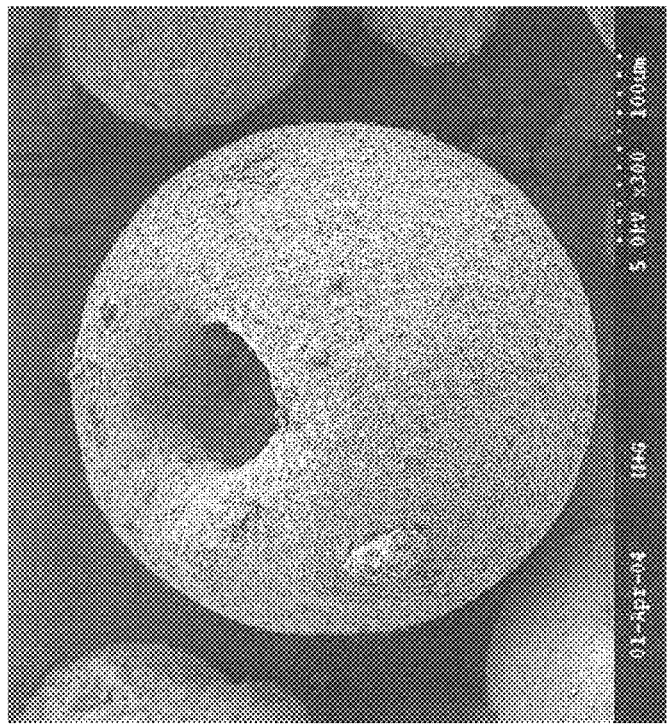
FIG. 1 is a microscopic image showing a conventional livestock feed using macsumsuk.
Figure 2:
FIG. 2 is a table showing component analysis of zeolite as a raw material of the present invention.

The zeolite, as shown in FIG. 2, contains large quantities of mineral substances, such as minerals, calcium, phosphorus, manganese, zinc, and copper, and thus will be expected to have effects of promoting the growth of farmed fish, improving the flesh, increasing the resistance against diseases, and the like.

The present invention is characterized in that the various clay minerals includes a bentonite.

Bentonite contains minerals necessary for the growth of fish, and delays the passage rate of a feed due to expandability thereof to help to improve the digestion and absorption rate.

Particularly, bentonite has excellent cementing property and thus has an effect of increasing the hardness of granulated feeds produced.

The zeolite and the bentonite are included therein and also, the macsumsuk can be included therein.

Macsumsuk contains components as shown in table 1 below. Macsumsuk belongs to quartzite of igneous rocks, and is characterized by becoming entirely weathered and thus easily broken. Particularly, white feldspar has been converted into kaolin in many cases, and also bentonite is nearly oxidized and thus scattered in a form of oxidized steel. Macsumsuk is characterized by containing a large quantity of amphibole, and is known to contain large quantity of zircon and thus a line is present therein, and has a good effect on living organisms.

TABLE 1

| Component | Content (wt %) |
| --- | --- |
| Silicon dioxide ($SiO_2$) | 65.80-71.80 |
| Aluminum oxide ($Al_2O_3$) | 10.99-14.99 |
| Iron oxide ($Fe_2O_3$) | 2.27-2.67 |
| Calcium oxide (CaO) | 1.79-2.19 |
| Magnesium oxide (MgO) | 0.46-0.66 |
| Potassium oxide ($K_2O$) | 3.50-5.50 |
| Sodium oxide ($Na_2O$) | 5.25-7.25 |
| Titanium dioxide ($TiO_2$) | 0.21-0.25 |
| phosphorus pentoxide ($P_2O_5$) | 0.05-0.07 |
| Manganese oxide (MnO) | 0.05-0.07 |
| Loss on ignition | 1.89-2.29 |

The wavelength generated from the macsumsuk is within the range of 8-14 um, and has been known to be far-infrared light, which is the most useful wavelength band to the living body. The far-infrared light of this wavelength band has been known to activate cells of the living body to promote metabolism of fish. Based on the fact that the far-infrared emissivity generated from pulverized macsumsuk (1 to 6 μm) is higher than the far-infrared emissivity generated from a rock-phase macsumsuk, the present invention is characterized in that macsumsuk is pulverized, particularly, calcined and pulverized, and then mixed and processed with other ingredients, to be prepared into a granule type, and thus be utilized as a carrier for supporting and immobilizing nutrients and minerals necessary for farmed fish.

Macsumsuk exhibits actions, such as adsorption due to porosity, precipitation of minerals, control of water quality, and increase in dissolved oxygen.

Figure 3:
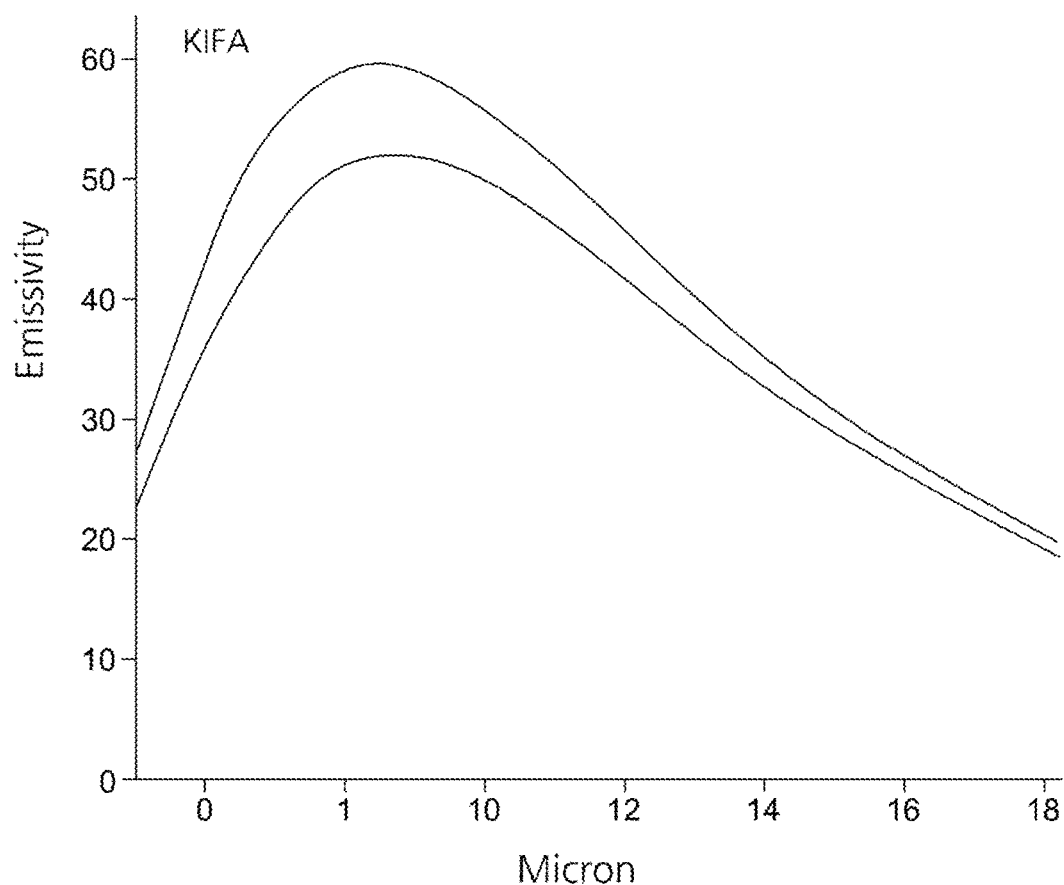
FIG. 3 is a graph showing far-infrared emissivity of macsumsuk as a raw material of the present invention.

FIG. 3 is a graph showing far-infrared emissivity of macsumsuk. In FIG. 3, the unit of emissivity is $W/m^2 \cdot \mu m$ based on the measurement at 70° C., and it was confirmed that macsumsuk exhibited high far-infrared emissivity similar to that of a black body. The graph in FIG. 3 shows measurement results by Korea Institute of Far Infrared Applied Estimation.

Figure 4:
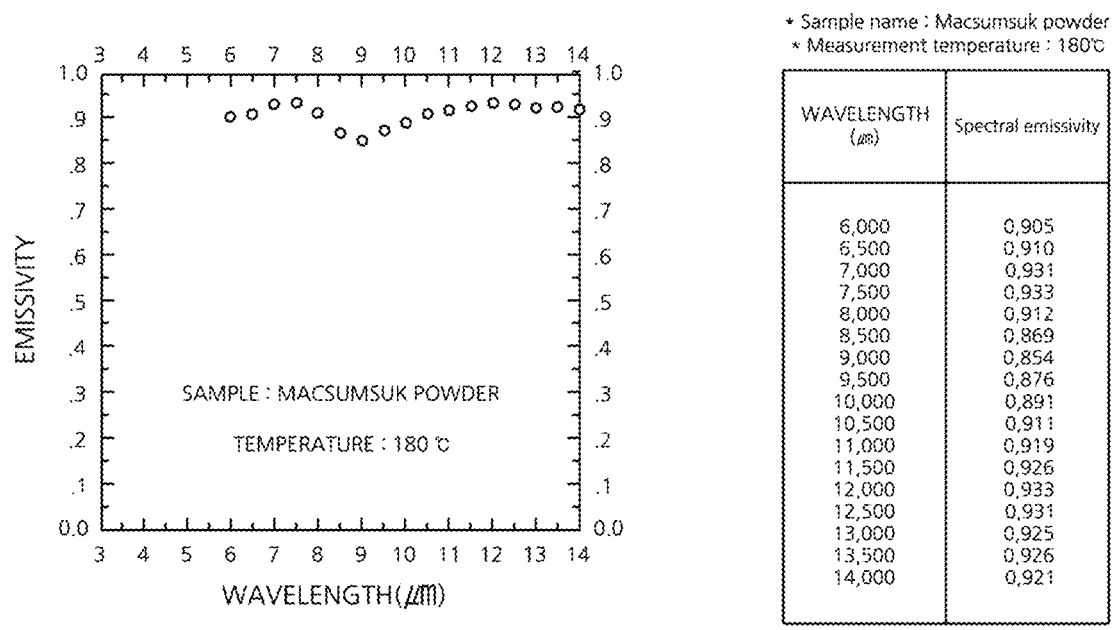
FIG. 4 shows a table and graph showing far-infrared spectral distribution test results of macsumsuk.

In addition, FIG. 4 shows far-infrared spectral distribution test results measured by Korea Research Institute of Standards and Science, and shows spectral distribution under conditions of a macsumsuk powder of 180° C. at a temperature of 23±1° C. and a relative humidity of 50%.

Also, the shells may be used as a component of the clay minerals.

The shells of abalone or oyster are used for the shells, which are shells of shellfishes. The shells are calcined at the above temperature, such that the foreign materials can be carbonized and removed as much as possible.

FIG. 5 shows component analysis results of abalone shells conducted by Institute of Agricultural Science, Chungnam National University, and it can be confirmed that the abalone shells contain crude ash, calcium, and magnesium.

Other clay minerals may be a kaolinite, elvan and mongtal stone.

In particular, the mongtal stone is called in China, and is called as a montmorillonite. It is a type of smectite and a hydrated aluminosilicate minerals that make up a layered structure and usually produced by micro particles having a micro size. Since it has high expandability during the absorption of water, it helps to improve the digestion absorption rate of the fish farming.

Hereinafter, a method for preparing organic coating porous granules for a fish feed or an assorted feed aid using blood of livestock and clay minerals of the present invention will be described.

However, embodiments of the preparing process of the present invention are provided so that the present invention will be sufficiently understood by those skilled in the art, and the present invention may be embodied in many different forms and the scope of the present invention is not limited thereto.

The method for preparing organic coating porous granules for a fish feed or an assorted feed aid using the blood of livestock and clay minerals according to the present invention includes a first mixing step, a second mixing step, a molding step, a molding step, and a cooling step.

1. First Mixing Step

It prepares plural clay minerals including a zeolite, a macsumsuk, and a bentonite and then pulverizing, calcining, and mixing them respectively, thereby preparing a powder mixture.

A zeolite ore powder (particles) is calcined (heated) to a temperature of 400-950° C. to prepare 100 parts by weight thereof.

12-60 parts by weight of bentonite is prepared based on 100 parts by weight of zeolite.

At this time, it is preferred that 15-83 parts by weight of bentonite is prepared based on 100 parts by weight of zeolite.

Besides, in case of adding the macsumsuk powder, it heats a macsumsuk ore powder to a temperature of 800-1,100° C. to prepare 4-60 parts by weight of the macsumsuk ore powder based on 100 parts by weight of the zeolite.

In the patent document 1, macsumsuk is mixed with water to prepare a slurry, and then processed, but in the present invention, the macsumsuk is mixed with other materials in a state where the macsumsuk is calcined and pulverized, and then made into a slurry by using the moisture contained in the blood of livestock without separate water.

A shell powder is heated to a temperature of 850-950° C. to prepare 0.5-1.1 parts by weight thereof based on 100 parts by weight of zeolite.

Here, the optimum mixing ratio in the powder mixture is that zeolite, macsumsuk, shells, and bentonite are preferably 60 wt %, 30 wt %, 0.5 wt %, and 9.5 wt %, respectively, based on 100 wt % of the entire powder mixture.

In addition, in the first mixing step, the respective raw materials may be pulverized and then mixed, or mixed and then pulverized.

2. Second Mixing Step

It prepares the blood of livestock, and then mixing the blood of livestock with the powder mixture by pulverizing, thereby preparing a fluid colloidal slurry.

At this time, it is mixed with the powder mixture at a weight ratio of 1:0.2-2.0, followed by pulverizing, thereby preparing a fluid colloidal slurry.

More preferably, the optimum mixing ratio between the blood of livestock and the powder mixture is preferably 1:1.

In the case where the weight of the blood mostly composed of water is excessively large, the slurry to be later described is thin, and thus there is no strong binding between particles of the powder mixture and the pore size excessively decreases. In addition, as the escaping gas increases, the volume of granules decreases, and thus the entire pore area is relatively reduced. In the case where the weight of the blood mostly consisting of water is excessively small, the pores are smoothly formed.

The pulverizing is preferably conducted for 10-600 minutes using a continuous wet fine pulverizer, a tube mill, a ball mill, or the like.

With respect to the blood (let blood) of the livestock, the blood of the Korean cattle is partially used for food, but Korean cattle blood is utilized as only one part. The blood of a pig (porcine blood) is made into blood powder particles by passing through selecting, refrigerating, sterilizing, drying, and pulverizing procedures, and the blood powder particles are mixed with sawdust, and then sold as an agricultural fertilizer.

Here, the blood (let blood) of the livestock preferably has a size of about 0.1 to 40 μm by passing through a pulverizing process or a filtering process.

The mixing procedure varies depending on the stirring rate. A time period of at least 30 minutes is preferable for low-rate stirring, and the time can be shortened for high-rate stirring.

In addition, preferably, the prepared fluid colloidal slurry is pulverized while being mixed and stirred, and sufficiently aged, followed by filtering to remove foreign materials, and then a molding step is conducted.

This blood (let blood) of livestock is jetted from a nozzle into a high-temperature granulator at high pressure in the molding step, and moved to the outside of the granule layer due to evaporation and movement of moisture, thereby forming an organic coating layer.

Here, the reason why the blood of livestock is limited to the above size range is that, the blood of the livestock should move to the outside of the granule layer through a gap between the powder mixture when being jetted from the nozzle and then instantly contacted with a high-temperature environment in the molding step, and thus the blood of the livestock having too large a size would have restricted movement.

In addition, in the case where the blood of livestock is too small a size, the blood of the livestock does not have a strong interaction therebetween after the blood of livestock is moved to the outside of the granule layer, and thus the infiltration rate of moisture from the outside is faster at the time of use, so that the float retention time may be decreased.

In addition, the blood (let blood) of the livestock is mixed with a solid-phase powder mixture to become a colloidal slurry having viscosity while retaining flowability, thereby allowing particles of the powder mixture to stick to each other. Thus, when the slurry is jetted into the high-temperature granulator in a molding step, adjacent particles of the powder mixture stick to each other, thereby minimizing the sites at which the pressure for evaporating moisture is eliminated, thereby increasing the evaporation pressure of moisture and thus forming the organic coating layer more easily. Further, when, together with the evaporation of moisture, the pores generated inside expand by the heat inside the granulator and thus try to evaporate, the slurry prevents the evaporation of small pores by the unit, and thus the expansion to a large size occurs inside the granule layer, thereby increasing the unit particle volume of the prepared granule and thus improving flowability.

In performing the second mixing step, the powder mixture forms agglomerates due to self cohesiveness and proteins of the blood of livestock, and diffusion due to electrostatic force of particles does not smoothly occur, and thus the powder mixture is present in an agglomeration state When the diffusion does not smoothly occur, the shape of granule after being molded is crushed or bent, resulting in a deterioration in the quality of final products and deteriorations in the workability and safety.

In order to prevent this, a dispersant has functions of controlling the pH value of the slurry, controlling the charge of particles, and controlling dispersion and agglomeration, thereby producing appropriate granules.

A polymeric inorganic salt, which is a cationic dispersant, may be used for the dispersant. A cationic polycarboxylic salt dispersant has no ash. When the pH of the slurry is about 6.0 to 10.0, the slurry has excellent dispersibility, and thus is appropriate for preparing a high-concentration of slurry of 30-60 wt %.

The quantity of dispersant used may be 0.5 to 4 wt %, and preferably 1.5 to 3 wt % based on the solid weight of granules completely prepared.

In addition, in order to increase the viscosity of the fluid colloidal slurry, a pH adjuster made of any one selected from an acid and a base may be added.

The initial fluid colloidal slurry, in which the powder mixture and the blood of livestock are mixed, has a pH of 7.0-9.5. The slurry sinks if being left for 1 hour, and the slurry agglomerates if being left for over 1 hour, and thus should be again stirred or pulverized.

When the acid or base is added during the pulverizing or mixing procedure, the cohesion and agglomeration can be prevented.

An example of the acid or base may be nitric acid or the like, and here, after the acid or base is added, the slurry is preferably left after being stirred for 30 minutes for stabilization.

The addition of acid or base may be possible in both of the first mixing step and the second mixing step. However, the acid or base is preferably added at the initial time of raw material mixing in order to prevent cohesion and agglomeration during the mixing procedure of raw materials, and particularly, the acid or base is preferably added before the use of the dispersant.

In addition, the bubbles generated in the molding step disturb the molding and have a bad influence on the quality.

Moreover, the use of the dispersant causes more bubbles, and it is important to remove or suppress the generation of the bubbles. For achieving this, a defoamer may be added.

Basically, the defoamer decreases the surface tension of bubbles to gather fine bubbles, thereby forming a large bubble which can be easily floated and thus removing the bubbles from a surface of the slurry, and decreases the surface viscosity of bubbles, thereby preventing the incorporated air from being made into the bubbles.

Solution type defoamers and emulsion type defoamers may be used, and silica/silicon-based defoamers or silicon-based defoamers may be used.

The defoamer is added before the introduction of the dispersant before the mixing and stirring of the dispersant, or during the stirring procedure of the dispersant, thereby increasing the pulverization and dispersion efficiency.

Meanwhile, an organic additive may be further added.

The organic additive is coated on the zeolite particles, and serves as a lubricant at the time of spray-drying and molding, thereby providing flowability and retaining the hardness of granules.

The viscosity of the aqueous solution varies and the hardness of granules varies depending on the kind and quantity of organic additive, and thus, the cementing agent should be selected in consideration of the components and molding method of macsumsuk.

The organic additive influences the hardness of granules, and thus, when a low-hardness organic additive is used, the granules may be easily deformed and may adhere to a container or the like at the time of treatment.

The fluid colloidal slurry prepared by the above process preferably has a concentration of 30-50 wt %, a pH value of 7.0-9.5, and a viscosity of 300-1,550 cps, due to the introduction of water, acid or base, or the dispersant, and preferably has a concentration of 35-45 wt %, a pH value of 7.0-9.5, and a viscosity of 300-1,350 cps, when the organic additive and the defoamer are added.

3. Molding Step

The fluid colloidal slurry prepared in the second mixing step is jetted by a press nozzle at a jet pressure of 7.0-13.0 kg/cm$^2$ in a granulator having an inner temperature of 130-400° C., thereby preparing granules having an average particle size of 0.1-3 mm.

The factors affecting the shape of granules, size and distribution of particles, and the texture of granules may be the concentration and viscosity of the slurry, the degree of dispersion, the jet pressure and quantity of the slurry, and the drying mass and temperature of the spray drier. These parameters may vary depending on the structure of the spray dryer and the nozzle type.

For example, the size of a drying drum has 10 m in height and 4 m in diameter. A granulator including a spray dryer for performing drying using LPG is designed such that a concurrent type spray drying is conducted using a press nozzle installed above and a counter flow type spray drying is conducted using a press nozzle installed below. In order to prepare granules to have a diameter of about 0.1-3.0 mm in the spray dryer, the concurrent spray drying may be conducted using a press nozzle (inner diameter: 0.3-0.8 mm) installed below in the spray dryer to increase the retention time of particles dispersed from an inside of the dryer. Operation conditions of the general spraying dryer are that the jet pressure is 7.0-13.0 kg/cm$^2$, the inner diameter of the press nozzle is 0.3-0.8 mm, the inner temperature of the spray dryer is 130-400° C., and the outlet temperature of the spray dryer is 80-160° C.

As an operation example of the granulator, the first ignition is conducted such that the temperature is allowed to reach 300° C. for 30 minutes by adjusting the LPG gas pressure to 0.1 kg/hr in the furnace. After 1 hour, the temperature is allowed to reach 500° C. for 30 minutes by adjusting the gas pressure to 0.125 kg/hr. When the temperature reaches 500° C., the gas pressure is adjusted to 0.15 kg/hr and thus the temperature is allowed to reach 500° C. for 1 hour and 30 minutes. Then, the burner of the hot furnace is ignited to increase the temperature for 2 hours, so that the inner temperature of the furnace reaches 800° C. When the temperature reaches 800° C., a ventilator is operated to move the heat into a cyclone. Then, when the temperature reaches 500° C., a nozzle is put into a lower end of the cyclone, and the finely pulverized fluid colloidal slurry is raised to an upper point by a pump pressure of 40 kgf/cm$^2$.

Here, the slurry is adjusted to have a concentration of 30±5 wt %, a viscosity of 500±200 cps, and a size of 0.2 mm or less.

The spun colloidal slurry falls while forming vortexes due to the hot air put in from a side surface of an upper part of the cyclone, and the moisture contained in the raw materials evaporates due to the inner heat maintained at 130-400° C., thereby obtaining granules having pores with a size of 0.1-3.0 mm.

Figure 7:
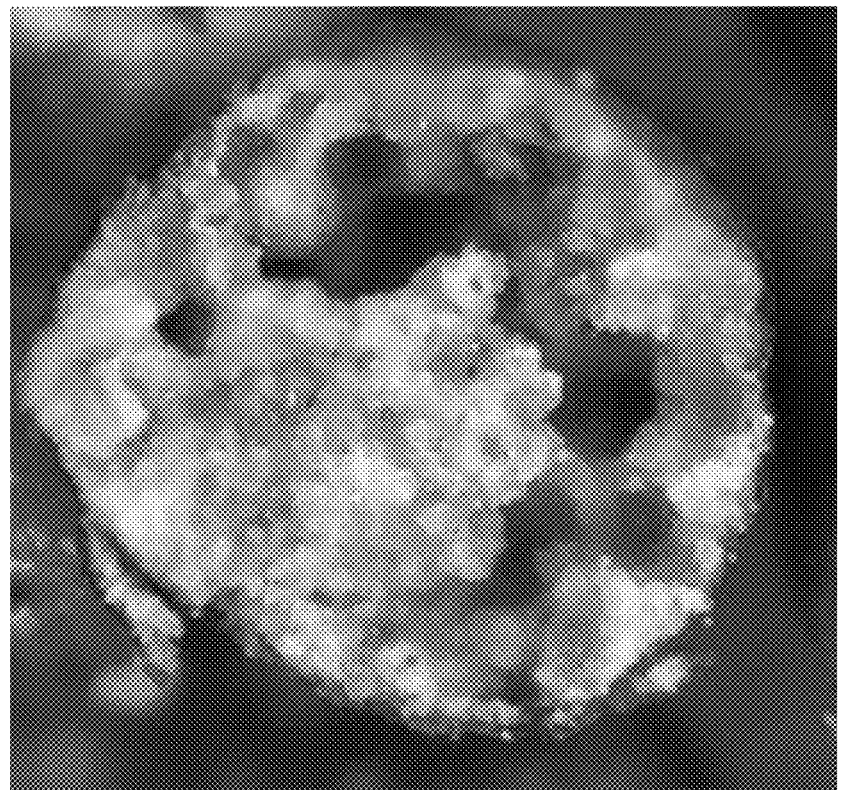
FIG. 7 is a microscopic image of a cut section of a granule prepared according to the present invention.

In this procedure, the moisture contained in the fluid colloidal slurry rapidly vaporizes inside the granules, and here, the granule layer is formed inside the granules. The inside of the granule layer has a porous structure as shown in FIG. 7, due to moisture evaporation and bubble expansion due to temperature expansion.

Through this procedure, while the fluid colloidal slurry is jetted by an instant high pressure inside the high-temperature granulator, the blood (let blood) of the livestock, which is the moisture inside the granules, evaporates to first move and escape to the outside of the granule layer, and the pores are formed inside, thereby forming a porous granule layer.

Here, the organic components, such as protein and fat, contained in the blood (let blood) of the livestock move outside together with the instant movement of moisture, and then cover the granule layer, thereby forming an organic coating layer having an approximately elliptical or circular cross-section, which is a mucous membrane like a protection film.

4. Cooling Step

The molded granules are cooled.

The granules may be cooled at room temperature in a natural slow cooling manner, or may be introduced in a cooling tank or the like in a high-rate cooling manner.

Figure 6:
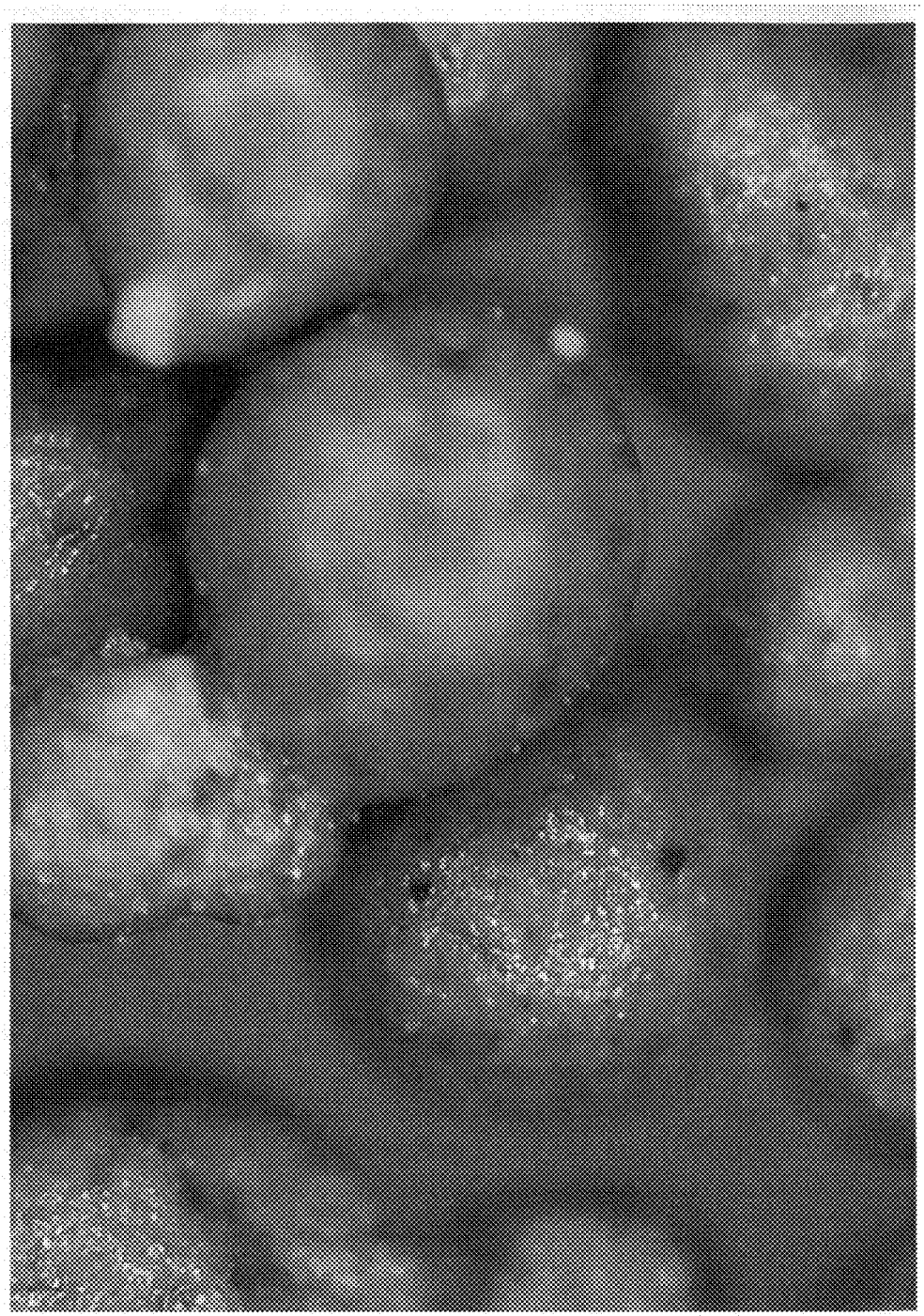
FIG. 6 is a microscopic image of granules prepared according to the present invention.

FIG. 6 is a microscopic image of 400× magnification of organic coating porous granules for a fish feed or an assorted feed aid using the blood of livestock and clay minerals of the present invention, which is prepared by the above-described processes.

FIG. 7 shows an inner structure of the granule cut, and it can be confirmed that the granule layer inside is porous and the organic coating layer is formed on the outside of the granule layer.

FIG. 8 shows component analysis results of the blood powder obtained by removing moisture from the blood of livestock, and the granules prepared by using the blood powder, and the component analysis was conducted by the Center for Scientific Instruments, Kyungpook National University.

FIG. 8 shows results thereof where the mixing ratio in the powder mixture is that zeolite, macsumsuk, shells, and bentonite are 60 wt %, 30 wt %, 0.5 wt %, and 9.5 wt %, respectively, based on 100 wt % of the entire powder mixture and the mixing ratio between the blood of livestock and the powder mixture is preferably 1:1.

As shown in the drawing, the granules of the present invention contain 16.60% of crude protein and 0.58% of crude fat, and it can be confirmed that the iron content per unit weight is significantly high.

In addition, the granules of the present invention prepared by the above-described processes are put in fresh water, and then the time when the granules sink is measured. As a result, the float time of the granules is within the range of 60-150 seconds, and thus it can be confirmed that the granules of the present invention are suitable to be used as an extruded feed.

In addition, the organic coating porous granules for a fish feed or an assorted feed aid using blood of livestock and shells of the present invention, which is prepared by the above-described processes, has a density of 0.70 to 1.22 g/cm³, and a specific surface area of 25 to 65 m²/g. The porosity is within the range of 47-62%, and it was confirmed that multiple nanopores with a size of 20-200 nm and multiple micropores with a size of 1 to 200 μm are formed in a bulk region.

As such, in the case where the weight per unit volume is minimized, when the raw materials are mixed during the mixing procedure in a feed mixing machine, the tendency of the raw materials to sink due to centrifugal force and gravity generated by rotation can be reduced, and the sinking of the raw materials during the transport can be minimized even during the feeding through a transport line.

In addition, the mixing and feeding procedures can be conducted at a quantitative mixing ratio, and the pores formed during the granule preparing procedure provide a structure which retains the floatability of a fish feed and serves as a carrier having an appropriate size, thereby improving the efficiency of the fish feed, and thus increasing the growth rate of the farmed fish and producing a good-quality flesh from the farmed fish.

Further, macsumsuk that emits far-infrared light having a wavelength suitable to contribute to the promotion of growth of the farmed fish is contained as a raw material, thereby contributing to the promotion in growth of the farmed fish.

Further, macsumsuk, zeolite, bentonite, and shells, as raw materials, contain lots of various minerals and nutrients, such as calcium, phosphor, manganese, zinc, and copper, and the blood of livestock contains lots of proteins, thereby uniformly and massively supplying nutrients necessary for promoting the growth of the farmed fish and improving the flesh of the farmed fish.

Further, these clay minerals are known to have an odor removing effect in fish farming, and thus granules composed of multiple minerals appear to contribute to the removal of odors generated from excretion in fish farming.

The granules prepared by the present invention can be mixed with a fish feed at a ratio of 0.5-3% in accordance with the growth of the farmed fish.

According to the present invention, provided are granules for a fish feed or an assorted feed aid, wherein the granule contains useful minerals suitable to be used for a feed, and includes an organic coating layer mainly composed of proteins formed on a surface of the granule by using the blood (let blood) of livestock, so that the time while water infiltrates into pores inside the granule mainly composed of inorganic substances is delayed, thereby obtaining having excellent fluidity.

More specifically, nutrients and minerals, which are contained in clay minerals necessary for farmed fish can be included inside the granule layer; and when a slurry is instantly jetted and dried in a high-temperature granulator, organic substances, such as proteins and fats, which are main components of the blood of livestock mixed with the above ingredients, move to the outside of the granule layer together with moisture and are then dried, to form an organic coating layer wrapping the granule layer, thereby forming multiple pores in the granule layer inside and allowing the organic coating layer outside to prevent the permeation of moisture into the granule layer by fatty components and the like contained in the organic coating layer itself, leading to an improvement in flowability of the granule.

Further, a granule including multiple pores is provided to increase the dissolved oxygen, thereby providing an excellent fish farming environment.

At this time, zeolite among the clay minerals contains large quantities of mineral substances, such as minerals, calcium, phosphorus, manganese, zinc, and copper, and thus will be expected to have effects of promoting the growth of farmed fish, improving the flesh, increasing the resistance against diseases, and the like.

Also, it contains minerals necessary for the growth of fish, delays the passage rate of a feed due to expandability thereof to help to improve the digestion and absorption rate, and particularly, the bentonite has excellent cementing property, thereby increasing the hardness of granulated feeds produced.

Moreover, by utilizing the macsumsuk as the additional clay minerals, far-infrared radiation generated from macsumsuk and clay minerals is used to adsorb and remove foreign materials and odor sources, thereby improving the taste of slices of raw farmed fish.

The present invention can be used as a fish feed or an assorted feed aid.

Especially, when it is used as the fish feed, since the floating time becomes longer, it is most suitable for the expanded feed.

What is claimed is:

1. A method for preparing organic coating porous granules for a fish feed or an assorted feed aid using the blood of livestock and clay minerals, the method comprising:
    a first mixing step of preparing plural clay minerals including a zeolite and a bentonite and then pulverizing, calcining, and mixing them respectively, thereby preparing a powder mixture;
    a second mixing step of preparing the blood of livestock, and then mixing the blood of livestock with the powder mixture by pulverizing, thereby preparing a fluid colloidal slurry;
    a molding step of jetting the fluid colloidal slurry prepared in the second mixing step at a high pressure in a granulator with an inner temperature of 130-400° C., thereby preparing granules including a granule layer having a porous structure and an organic coating layer formed outside the granule layer to wrap the granule layer; and
    cooling the molded granules.

2. The method of claim 1, wherein before the molding step, one to three selected from a dispersant, a pH adjuster, and a defoamer are added.

3. The method of claim 2, wherein the fluid colloidal slurry prepared in the second mixing step has a concentration of 30-50 wt %, a pH value of 7.0-9.5, and a viscosity of 300-1,550 cps.

4. A method for preparing organic coating porous granules for a fish feed or an assorted feed aid using the blood of livestock and clay minerals, the method comprising:

a first mixing step of heating a zeolite ore powder to a temperature of 400-950° C. to prepare 100 parts by weight of the zeolite ore powder and preparing 12-60 parts by weight of bentonite based on 100 parts by weight of zeolite, followed by mixing, thereby preparing a powder mixture;

a second mixing step of preparing the blood of livestock, and then mixing the blood of livestock with the powder mixture at a weight ratio of 1:0.2-2.0, followed by pulverizing, thereby preparing a fluid colloidal slurry;

a molding step of jetting the fluid colloidal slurry prepared in the second mixing step through a nozzle at a jet pressure of 7.0 to 13.0 kg/cm$^2$ in a granulator with an inner temperature of 130-400° C., thereby preparing granules having an average diameter of 0.1-3 mm and including a granule layer having a porous structure and an organic coating layer formed outside the granule layer to wrap the granule layer; and cooling the molded granules.

5. The method of claim 4, wherein the first mixing step further comprising steps of heating a macsumsuk ore powder to a temperature of 800-1,100° C. to prepare 40-60 parts by weight of the macsumsuk ore powder based on 100 parts by weight of the zeolite and heating a shell powder to 850-950° C. to prepare 0.5-1.1 parts by weight of the shell powder based on 100 parts by weight of zeolite.

6. The method of claim 4, wherein before the molding step, one to three selected from a dispersant, a pH adjuster, and a defoamer are added.

7. The method of claim 6, wherein the fluid colloidal slurry prepared in the second mixing step has a concentration of 30-50 wt %, a pH value of 7.0-9.5, and a viscosity of 300-1,550 cps.

* * * * *